United States Patent [19]
Guest

[11] Patent Number: 5,374,030
[45] Date of Patent: Dec. 20, 1994

[54] VALVE ACTUATING MECHANISM

[75] Inventor: James Guest, Trussville, Ala.

[73] Assignee: Stockham Valves & Fittings, Birmingham, Ala.

[21] Appl. No.: 192,384

[22] Filed: Feb. 7, 1994

[51] Int. Cl.$^5$ .................. F16K 25/00; F16K 31/52
[52] U.S. Cl. .................. 251/165; 74/22 R; 74/424.8 VA; 251/229; 251/267; 251/309
[58] Field of Search ............ 74/22 R, 89.15, 424.8 R, 74/424.8 VA, 527; 251/229, 264, 56, 164, 165, 166, 265, 266, 267, 268, 270, 297, 309

[56] References Cited

U.S. PATENT DOCUMENTS

| | | | |
|---|---|---|---|
| 2,459,682 | 1/1949 | Carrie | 74/22 R |
| 2,705,609 | 4/1955 | Prescott | 74/22 R |
| 2,795,960 | 6/1957 | Heinen et al. | 251/165 |
| 2,858,097 | 10/1958 | Blomstran et al. | 251/164 |
| 2,872,155 | 2/1959 | Hazard | 251/165 |
| 2,889,133 | 6/1959 | Blomstran et al. | 251/164 |
| 3,188,049 | 6/1965 | Zawacki et al. | 251/267 |
| 3,198,034 | 8/1965 | DeWitte et al. | 251/267 |
| 4,927,113 | 5/1990 | Heinen | 251/165 |

*Primary Examiner*—George L. Walton
*Attorney, Agent, or Firm*—Veal & Associates

[57] ABSTRACT

An improved valve plug actuator is provided which is substantially impervious to environmental contamination and which provides greater axial transfer of seating force to an associated valve plug. The actuator uses an indexing race formed in an indexing sleeve to support a thrust bearing on one side of an operating screw collar and an enhanced retaining ring to capture an opposing thrust bearing. Lubrication containment and environmental isolation of the interactive surfaces of the actuator is maintained by o-ring seals carried by the retaining ring and by a lowermost movable component of the actuator which also is rigidly affixed to the associated valve plug.

7 Claims, 3 Drawing Sheets

VALVE ACTUATING MECHANISM

FIELD OF THE INVENTION

The present invention relates to plug type valves and more particularly to the actuating mechanism for such valves, wherein the plug is held against rotation to prevent rotation against the valve seat. In even greater particularity the invention may be described as improvements in the sealing capacity and effectiveness of the valve actuators.

BACKGROUND OF THE INVENTION

Actuator mechanisms such as shown in U.S. Pat. No. 2,858,097 are known and have been sold commercially by the assignee of that patent for many years and have represented a commercially viable product. However in the years since that valve actuation mechanism was introduced increasing demands on the capabilities of the valve and the actuator have been experienced. Accordingly, there exists a need for a valve which has improved operational characteristics relative to the older valves such that tighter seals can be made and for a valve which has actuator mechanisms which are more maintenance free and less susceptible to environmental contamination.

SUMMARY OF THE INVENTION

It is an object of the present invention to provide a hermetically sealed actuator mechanism which is impervious to environmental contamination. Yet another object of the invention is to provide a sealed actuator mechanism which is internally lubricated.

Another object of the invention is to provide an actuator which meets the above requirements and which is capable of providing a tighter valve seal without the necessity of applying greater actuator force than prior actuators.

These and other objects and improvements in the art are achieved in the present invention through the utilization of a combination of elements which cooperate to form an actuator which is impervious to environmental contamination and which can provide much better sealing characteristics. Two factors which influence the sealing ability of a plug valve to provide maximum sealing pressure per unit of actuating force are directly related to the internal friction of the actuating mechanism. One is the proper lubrication of the mechanism and the second is the nature of the contacting surfaces within the actuator. In the '097 device a retaining ring was used to capture an inner rotating member such that axial loading of the member, which is normal during the seating of a valve, applies a component of force normal to the adjacent relatively moving surfaces, thereby increasing frictional losses in a manner proportional to the force component applied. Likewise the interactive surfaces of the actuator mechanism were unprotected from environmental contamination and unlubricated. In the present invention the plug is rigidly affixed to an indexing nut through an intermediate plug shaft. The indexing nut is mounted for axial and limited rotational movement within an actuator sleeve, however instead of a mere sliding fit as previously required, the indexing nut is spaced from the inner surface of the sleeve and has a circumferential groove wherein a Teflon or other suitable o-ring is mounted. The o-ring provides a seal between the indexing nut and the sleeve. At the upper end of the actuator, a screw-in retaining ring has been employed to enable the device to withstand greater axial loading. A circumferential groove in an operating screw, captured by the retaining ring carries a second o-ring, which provides a seal between the screw and ring. All of the interactive surfaces of the actuator are located between these two o-rings thus the actuator is sealed from the environment and any desired lubrication is likewise sealed in between the rings. To further reduced frictional losses during axial loading thrust bearings may be inserted between selected surfaces.

A clearer understanding of these and other features and advantages of my invention may be obtained by reference to the figures and the accompanying description of the preferred embodiment.

BRIEF DESCRIPTION OF THE DRAWINGS

Apparatus embodying features of this invention are depicted in the accompanying drawings which form a part of this disclosure, wherein.

DESCRIPTION OF THE PREFERRED EMBODIMENT

Figure 1:
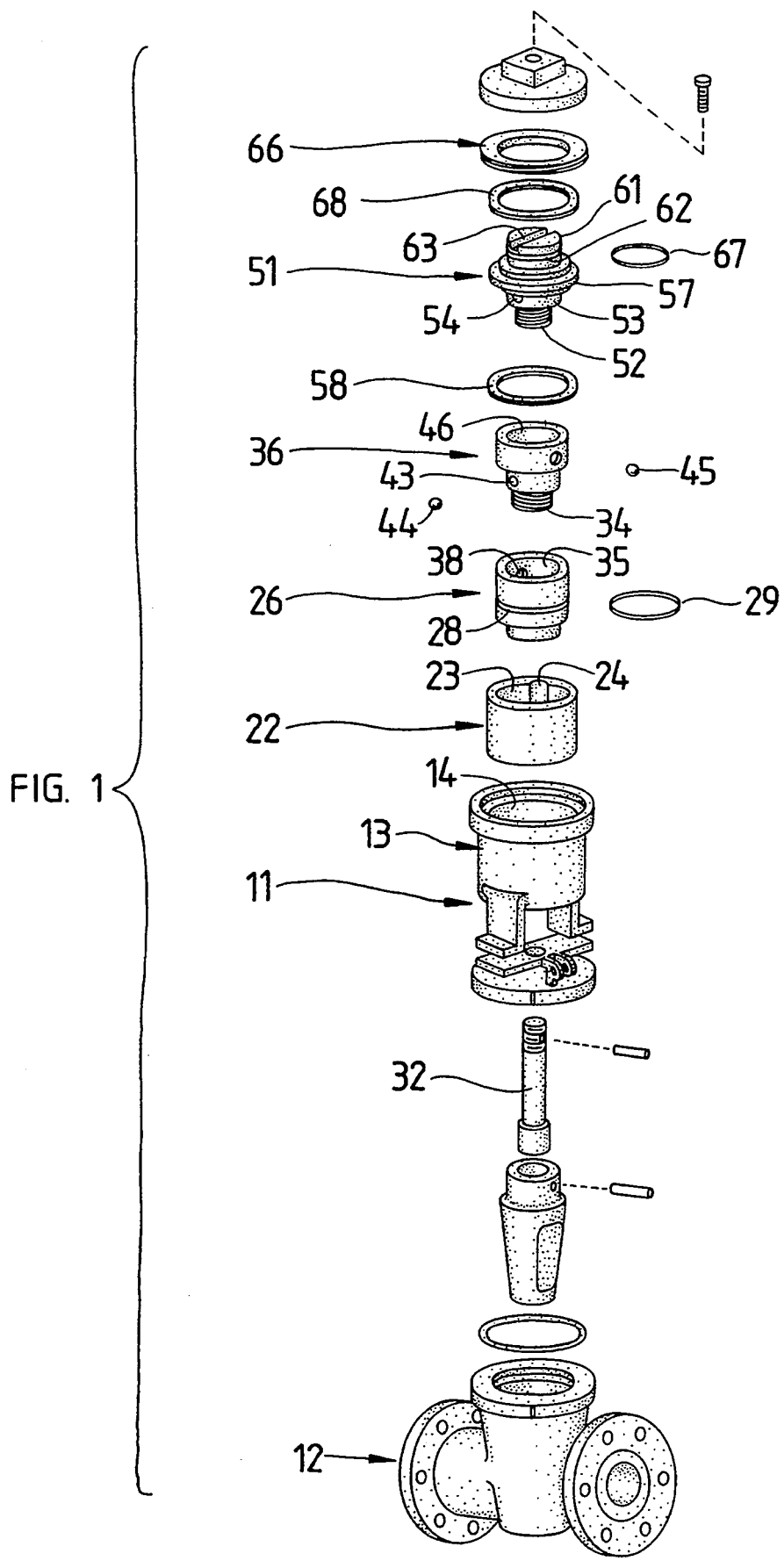
FIG. 1 is an exploded view of the actuator mechanism and the sleeve which houses the components.
Figure 2:
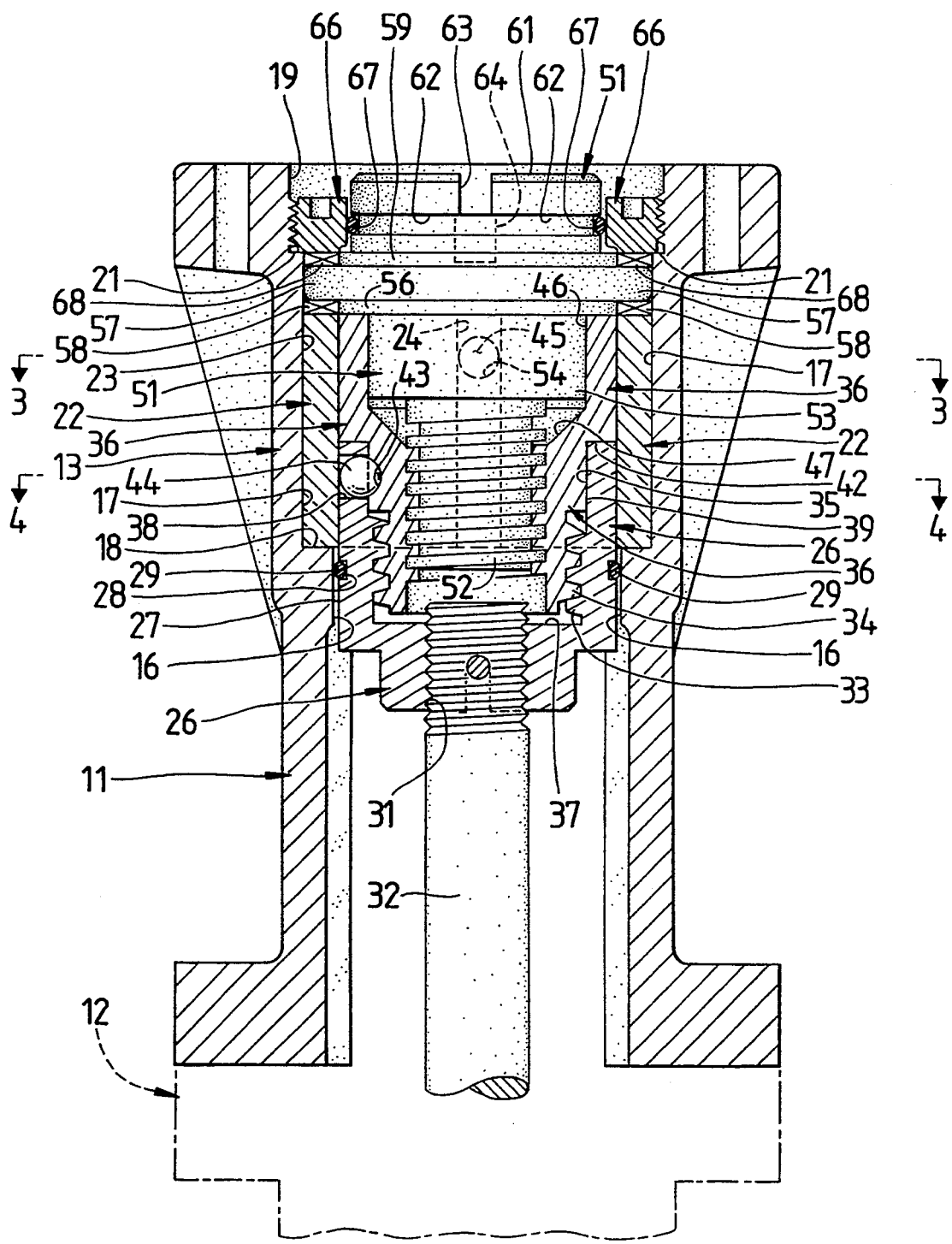
FIG. 2 is a sectional view showing the improved actuator in assembled form.
Figure 3:
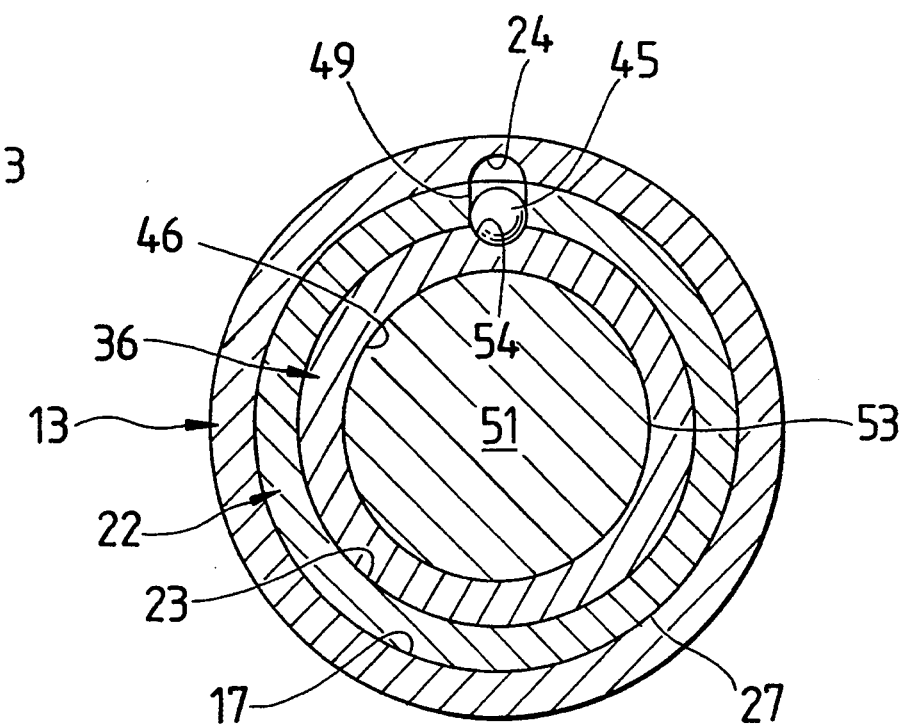
FIG. 3 is a sectional view taken along line 3—3 of FIG. 2.
Figure 4:
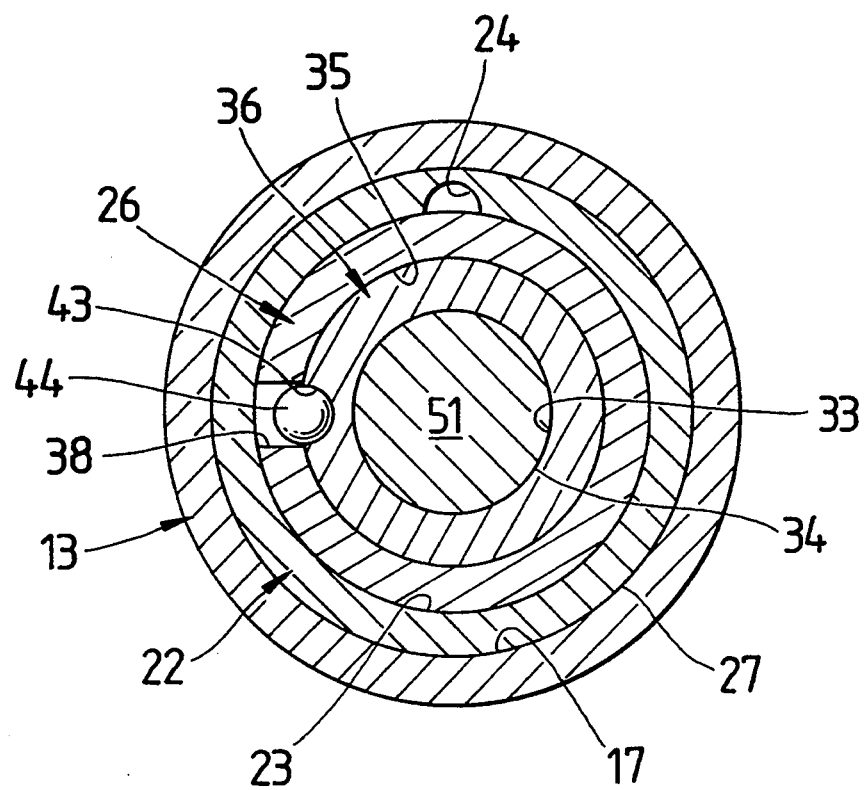
FIG. 4 is a sectional view taken along line 4—4 of FIG. 2.

Referring to the drawings for a better understanding of the invention, we show a yoke 11 adapted for attachment to a valve body 12. The valve body 12 defines therein the valve seat, which is not shown, in a manner well known in the art. The upper end of the yoke 11 is connected to a sleeve member 13 which is axially aligned with the valve seat and receives therewith in the interactive parts of the valve actuating mechanism. The sleeve 13 has an inner surface 14 defining an axial bore having three distinct sections identified by variation in the diameter of the bore. The bore includes a proximal section 16 formed closest to the valve body 12 and having the smallest diameter, an intermediate section 17 adjacent the proximal section having an enlarged diameter with the boundary between the proximal section 16 and intermediate section 17 defining a shoulder 18, and a distal section 19 defined by a further enlarged diameter and a second shoulder 21.

An indexing sleeve 22 is fitted within intermediate section 17 in abutting relationship with shoulder 18. Indexing sleeve 22 has an inner surface 23 defining an inner diameter slightly less than the diameter of proximal section 16. Formed in indexing sleeve 22 is a paraxially extending indexing race 24, which is substantially semicircular as viewed in cross section. Sleeve 22 is not intended to move within the bore and may be affixed to outer sleeve by a radially extending bolt or like member. Slidably received within the indexing sleeve 22 is an indexing nut 26, having an outer surface 27 which has formed therein a circumferential groove 28 which receives therein an o-ring 29 of sufficient size and material to effectively seal the space between the proximal bore 16 and surface 27, while allowing axial and rotational relative movement between the two surfaces. The indexing nut 26 has a depending portion defining a threaded socket 31 wherein the valve stem 32 is affixed for connecting the valve plug 12 to the indexing nut.

Internally, indexing nut 26 is provided with left handed threads 33 along a lower portion thereof for receiving external threads 34 of an intermediate nut 36 and a shoulder 37 subjacent the threads 33. Superjacent the threads 33 the interior surface 35 of the indexing nut 26 is smooth and has formed therein a radially extending aperture 38 which exits through surface 27 superjacent groove 28.

Intermediate nut 36 has a stepped external surface such that a smooth portion 39 adjacent the external threads 34 fits in sliding cooperation with surface 35 of indexing nut 26. An enlarged diameter portion 41 has the same diameter as the surface 27 and is in sliding abutting relationship with the internal surface of indexing sleeve 22, thus an external shoulder 42 is formed on intermediate nut 36. Between threads 34 and shoulder 42, a generally hemispheric recess 43 is formed in the outer surface of smooth portion 39. It will be appreciated that when a locking member, such as a steel ball 44, is positioned such that it is captured in aperture 38 and recess 43, indexing nut 26 and intermediate nut 36 are constrained to move concomitantly.

Intermediate nut 36 further defines an axial bore having a major diameter region 46 forming the opening thereof distal the valve body 12. Region 46 terminates in a conic region 47 wherein the bore diameter diminishes until an internal righthand threaded region 48 is reached. The threaded region 48 terminates near the proximal end of the intermediate nut 36. An opening 49 extends radially through intermediate nut 36 from axial bore region 46 to the external surface portion 41.

An operating screw 51 is axially aligned with and has a lower threaded portion 52 which engages intermediate nut 36 by engagement with the internal threaded region 48. Lower threaded portion 52 depends from a cylindrical portion 53 which has a diameter sufficient to permit it to fit in sliding relationship within the major diameter bore of intermediate nut 36 and a thickness commensurate with the length of the major diameter bore 46. A hemispherical depression 54 is formed on the radial surface of cylindrical portion 53, such that when a locking member such as a steel ball 45 is captured partially within depression 54 and partially within opening 49 then intermediate nut 36 and operating screw 51 are constrained to move concomitantly. It will be appreciated that two locking members, steel balls 44 and 45 are employed in the actuator. Ball 44 is positioned in the aperture in indexing nut 26 and is laterally movable into registry either indexing race 24 or recess 43 in intermediate nut 36. Ball 45 is positioned in opening 49 in intermediate nut 36 and is laterally movable into registry with either indexing race 24 or recess 54 in operating screw 51. Note that the apertures and recesses in the components are offset at ninety degrees about the axis of rotation such that only one of the balls 44 and 45 may be in registry with the indexing race at any time. In this manner the actuator may perform the lift and turn function in a manner similar to the '097 patent.

Cylindrical portion 53 depends, in turn, from an intermediate diameter cylindrical portion 56 which rests in sliding abutment atop intermediate nut 36 and is smaller in diameter than inner surface 23 of the indexing sleeve 22. A major diameter portion 57 of the operating screw 51 is formed superjacent intermediate portion 56, and extends outwardly above indexing sleeve 22 in sliding annular relationship with housing sleeve surface 17. Captured between major diameter portion 57 and indexing sleeve 22 and between housing sleeve 13 and intermediate diameter portion 56 is a lower thrust bearing 58. Atop major diameter portion 57 is an upper intermediate diameter portion 59 of the same dimension as portion 56, and atop portion 59 is screw head 61, which has a diameter less than that of portion 59. Screw head 61 has a circumferential groove 62 formed therein and a diametrical slot 63 formed in the top thereof. The diametrical slot 63 has an axial recess 64 formed therein.

Circumscribing screw head 61 is a retaining ring 66 which threadedly engages surface 19 of housing sleeve 13 and is in spaced relation to screw head 61. A o-ring 67 is carried in groove 62 and is maintained in sliding sealing relation with retaining ring 66. Retaining ring 66 is much more robust than the snap in rings previously used thus providing much greater resistance to axial loading. Captured between retaining ring 66 and major diameter portion 57 and between upper intermediate diameter portion 59 and surface 21 is upper thrust bearing 68. Thrust bearings 58 and 68 in conjunction with ring 66 greatly enhance the transfer of axial force input by the operating screw to the valve plug. However, environmental contamination can also greatly reduce the efficiency of force transfer by degradation of the bearing surfaces as well as the surfaces of the mating threads, therefore a lubricant is employed and retained between o-ring 29 and o-ring 67. Thus, the valve actuator is substantially impervious to environmental conditions and may be employed in applications where the valve may not be operated for long periods of time without fear of internal contamination of the actuator degrading the valve performance.

While I have shown my invention in several forms, it will be obvious to those skilled in the art that it is not so limited but is susceptible of various changes and modifications without departing from the spirit thereof.

What I claim is:

1. An improved valve actuator mechanism for actuating a valve plug wherein said plug is adapted to axially unseat, then turn selectively between an open and close position turn and axially reseat a valve body, a housing sleeve adapted to be rigidly connected to said valve body, said sleeve having an inner surface defining an axial bore therethrough; an indexing sleeve having an axial bore and an axial groove formed therein said sleeve adapted to be received within an enlarged diameter bore of said housing sleeve distal said valve body; an indexing nut slidably received within said indexing sleeve, in spaced relation to said housing sleeve; an intermediate nut slidably secured within said indexing sleeve and rotatably and threadedly coupled to said indexing nut; an operating screw slidably secured in said enlarged bore distal said valve body coaxially with said indexing sleeve, and threadably and rotatably coupled to said intermediate nut in opposition to said indexing nut; means for selectively arresting the rotation of either one of said indexing nut and said intermediate nut relative to said indexing race; a retaining ring circumscribing a portion of said operating screw and adapted for retaining said operating screw within said enlarged diameter bore; first thrust bearing means interposed between said retaining ring and a first surface of a major diameter portion of said operating screw for reducing frictional losses; second thrust bearing means interposed between a second surface of said major diameter portion of said operating screw and said indexing sleeve for reducing frictional losses; first sealing means circumscribing said operating screw and slidably engaging an interior surface of said retaining ring to form a seal therebetween; and second sealing means circumscribing said indexing nut and slidably engaging an interior surface of said sleeve to form a seal therebetween.

2. A mechanism as defined in claim 1 wherein said first sealing means comprises a first o-ring carried in a circumferential groove on said operating screw.

3. A mechanism as defined in claim 2 wherein said second sealing means comprises a second o-ring carried in a circumferential groove on said indexing nut.

4. A mechanism as defined in claim 3 wherein a quantity of lubricant is confined within said sleeve intermediate said first and second o-rings.

5. A mechanism as defined in claim 3 wherein said thrust bearing means comprises roller bearings.

6. A mechanism as defined in claim 3 wherein said retaining ring is threadably engaged with the axial bore of said sleeve.

7. A mechanism as defined in claim 3 wherein said plug is rigidly affixed to said indexing nut.

* * * * *